(12) United States Patent
Valiyambath Krishnan et al.

(10) Patent No.: US 10,081,023 B2
(45) Date of Patent: Sep. 25, 2018

(54) SPRAY NOZZLE

(71) Applicant: KONINKLIJKE PHILIPS N.V., Eindhoven (NL)

(72) Inventors: Mohankumar Valiyambath Krishnan, Eindhoven (NL); Yen Leng Pang, Eindhoven (NL); Zhifeng Xu, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/317,149

(22) PCT Filed: Feb. 16, 2016

(86) PCT No.: PCT/EP2016/053243
§ 371 (c)(1),
(2) Date: Dec. 8, 2016

(87) PCT Pub. No.: WO2016/131813
PCT Pub. Date: Aug. 25, 2016

(65) Prior Publication Data
US 2017/0348706 A1    Dec. 7, 2017

(30) Foreign Application Priority Data
Feb. 17, 2015 (EP) ..................... 15155309

(51) Int. Cl.
*B05B 1/04* (2006.01)
*D06F 75/10* (2006.01)
(Continued)

(52) U.S. Cl.
CPC ............. *B05B 1/044* (2013.01); *B05B 1/04* (2013.01); *B05B 1/3006* (2013.01); *B05B 1/323* (2013.01);
(Continued)

(58) Field of Classification Search
CPC .......... D06F 75/10; D06F 75/18; D06F 75/22; F22B 1/288; B05B 1/00; B05B 1/044;
(Continued)

(56) References Cited

U.S. PATENT DOCUMENTS

| 1,636,314 A | 7/1927 | Murray | |
|---|---|---|---|
| 2,730,274 A * | 1/1956 | Brown | B65D 47/2037 222/490 |
| 3,041,756 A * | 7/1962 | Foster | D06F 75/18 38/77.5 |

(Continued)

FOREIGN PATENT DOCUMENTS

| CN | 204039806 U | 12/2014 |
|---|---|---|
| GB | 2013821 A | 8/1979 |

(Continued)

*Primary Examiner* — Ismael Izaguirre

(57) ABSTRACT

The invention relates to a spray nozzle comprising an elastomeric tube (1) comprising a proximal end (7) through which a fluid is intended to enter said tube (1), and a distal end (8). The spray nozzle also comprises a slit (9) formed in the elastomeric tube (1) between the proximal end (7) and the distal end (8), for spraying the fluid out from the elastomeric tube (1). The elastomeric tube (1) includes a reinforcing element (10, 11) for limiting deformation of the elastomeric tube (1). By providing a slit in a tube between the proximal and distal ends of the tube, the slit can be sized to provide a broad spread pattern to the spray. The reinforcing element prevents over-expansion or deformation of the elastomeric tube.

19 Claims, 5 Drawing Sheets

(51) Int. Cl.
*B05B 1/32* (2006.01)
*B05B 1/30* (2006.01)
*B05B 9/00* (2006.01)
*B05B 9/04* (2006.01)
*F22B 1/28* (2006.01)
*F16K 15/14* (2006.01)

(52) U.S. Cl.
CPC ............ *B05B 9/002* (2013.01); *B05B 9/0403* (2013.01); *D06F 75/10* (2013.01); *F22B 1/288* (2013.01); *F16K 15/147* (2013.01)

(58) Field of Classification Search
CPC ......... B05B 1/3006; B05B 1/323; B05B 3/00; B05B 9/002; B05B 9/0403; B05B 1/04; F16K 15/147; F16K 21/04; F16K 31/00
See application file for complete search history.

(56) References Cited

U.S. PATENT DOCUMENTS

| | | | |
|---|---|---|---|
| 3,174,694 A | 3/1965 | Kitabayashi | |
| 3,674,183 A * | 7/1972 | Venable | B65D 47/2031 222/212 |
| 3,811,208 A * | 5/1974 | Vieceli | D06F 75/14 38/77.8 |
| 3,899,135 A * | 8/1975 | O'Brian | A01G 25/023 137/848 |
| 4,107,860 A * | 8/1978 | Coggiola | D06F 75/18 38/77.83 |
| 4,148,420 A * | 4/1979 | Morrissette | B65D 47/2031 137/846 |
| 5,791,510 A * | 8/1998 | Paczonay | A47G 21/185 215/11.4 |
| 5,890,655 A | 4/1999 | Collias | |
| 6,009,645 A * | 1/2000 | Shimizu | D06F 75/14 38/77.5 |
| 6,155,299 A * | 12/2000 | Martin | B60S 1/52 137/846 |
| 6,371,392 B1 | 4/2002 | Steinman | |
| 6,711,840 B1 | 3/2004 | Rosenzweig | |
| 8,915,484 B2 * | 12/2014 | Harward | A45F 3/20 222/490 |
| 2004/0159820 A1 * | 8/2004 | Yang | A45F 3/16 251/342 |
| 2011/0056992 A1 * | 3/2011 | Harward | A45F 3/20 222/209 |

FOREIGN PATENT DOCUMENTS

| | | |
|---|---|---|
| JP | 49101307 U | 8/1974 |
| JP | 52046310 U1 | 9/1975 |

* cited by examiner

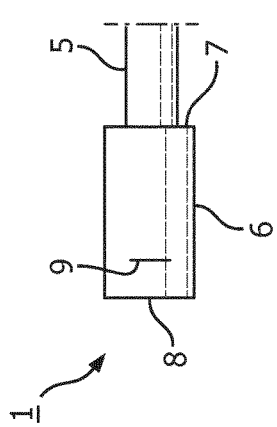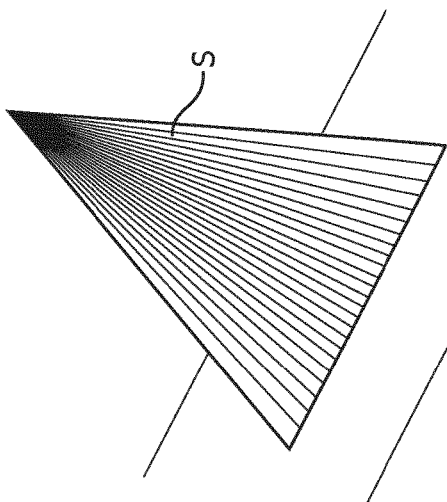
FIG. 4A  FIG. 4B
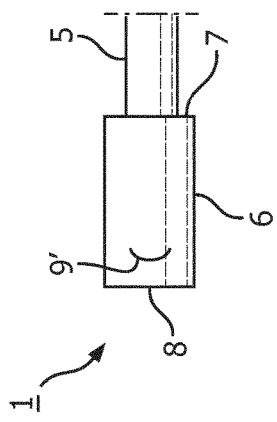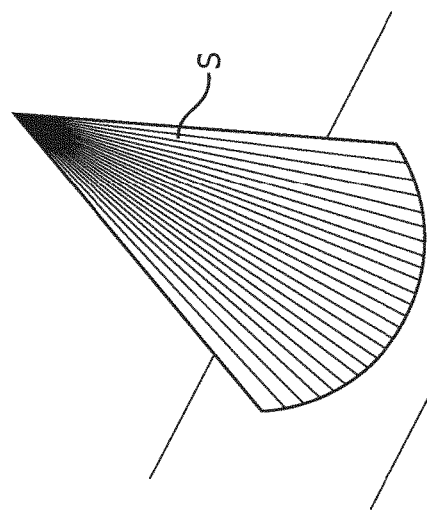
FIG. 5A  FIG. 5B

SPRAY NOZZLE

This application is the U.S. National Phase application under 35 U.S.C. § 371 of International Application No. PCT/EP2016/053243, filed on Feb. 16, 2016, which claims the benefit of International Application No. 15155309.6 filed on Feb. 17, 2015. These applications are hereby incorporated by reference herein.

FIELD OF THE INVENTION

The present invention relates to a spray nozzle. In particular, the invention relates to a water spray nozzle for use with a steam generator of a steaming appliance, for instance, a garment steamer. The invention also relates to a garment steamer that incorporates the spray nozzle of the invention.

BACKGROUND OF THE INVENTION

In many steaming appliances, such as garment steamers, an electrical pump is used to deliver water onto a heated surface to generate steam. In some devices, water is delivered from a dosing head as a single stream or jet onto the heated surface. In some applications, the water is required to be spread over a larger area for the purpose of better heat extraction and steaming performance and so a spray nozzle or a multi jet nozzle is used.

Conventional spray nozzles typically have a fine opening to enable atomisation and large spread of water. Normally, the nozzles are made of metal or hard polymers. Water under pressure is forced through the spray nozzle and a resultant high velocity discharge of water results in a broad spray pattern. Pressure of water, the size of the nozzle opening and features to create a swirl near the outlet of the spray nozzle determine the spray droplet dimensions and the spray angle.

The higher the pressure, the better the atomisation and the spray angle but, consequently, the flow rate must also be higher. To lower the flow rate to values that the steam generator can support, the nozzle opening must be very small. Since a user of the garment steamer may use hard water during operation, scale can build up inside the nozzle, especially during rest periods when there is no water flow and the residual water gets evaporated due to the heat in the steam chamber, the nozzle can easily get clogged up with scale. Consequently, water flow is blocked by scale build up and the steaming operation is impaired or prevented.

A spray nozzle for spraying a liquid under pressure is known from U.S. Pat. No. 1,636,314 and comprises an elastomeric disc having a slit which opens under the pressure of the supplied fluid to provide a spray. However, as the slit is relatively small, the spray pattern is relatively narrow, and it can easily get blocked with scale.

A nozzle piece is known from U.S. Pat. No. 3,174,694 and includes a resilient discharge tube having a slit through which a solution is emitted when the discharge tube is manually bent.

SUMMARY OF THE INVENTION

It is an object of the invention to provide a spray nozzle which substantially alleviates or overcomes one or more problems with conventional spray nozzles.

The invention is defined by the independent claims. The dependent claims define advantageous embodiments.

According to the present invention, there is provided a spray nozzle comprising: an elastomeric tube comprising a proximal end through which a fluid is intended to enter said tube, and a distal end, a slit formed in said elastomeric tube between said proximal end and said distal end for spraying said fluid out from said elastomeric tube, wherein the elastomeric tube includes a reinforcing element for limiting deformation of the elastomeric tube.

By providing a slit in an elastomeric tube between the proximal and distal ends of the tube, the slit can be sized to provide a broad spread pattern to the spray. The reinforcing element prevents over-expansion or excessive deformation of the elastomeric tube.

In a preferred embodiment, the elastomeric tube comprises a cylindrical wall, said slit being formed in said wall.

The slit is conveniently formed in the cylindrical wall of the tube rather than in its distal end. This means that the length of the slit can be increased and extend around the curved surface of the cylindrical wall to provide a broader spray pattern.

The cylindrical wall preferably has a longitudinal axis and the slit extends in a circumferential direction about said longitudinal axis.

As the slit extends in a circumferential direction about the axis, it provides a broad spray pattern that is linear or straight.

In a preferred embodiment, the reinforcing element surrounds the cylindrical wall.

By ensuring that the reinforcing element surrounds the cylindrical wall, over-deformation along the length of the tube is restricted or prevented.

The reinforcing element preferably extends about the distal end of the elastomeric tube.

By extending the reinforcing element over the distal end of the tube, deformation in a longitudinal direction is also restricted.

The reinforcing element may be formed integrally with the elastomeric tube. This makes the tube easy to manufacture and avoids having to attach a separate component to the tube during assembly.

Preferably, the reinforcing element comprises a region of increased thickness of the material forming the elastomeric tube.

A region of increased thickness is an advantageous way of providing reinforcement as it avoids having to use a different material.

In an alternative embodiment, the reinforcing element preferably is a separate component secured to the elastomeric tube.

A separate element may have a higher rigidity than the material from which the tube is formed and so restrict expansion of the tube.

In one embodiment, the separate component comprises a housing secured to said elastomeric tube.

The housing may partially surround the tube so only that part of the tube which is surrounded is prevented from expanding beyond a certain limit.

In other preferred embodiments, the slit may be arcuate in a non-circumferential direction about the longitudinal axis of the elastomeric tube.

By providing a slit that is curved or otherwise shaped in a non-circumferential direction, differently shaped spray patterns are achievable.

In any of the preferred embodiments, the slit may have opposing edges which lie in contact with each other in a closed position when fluid pressure within the elastomeric tube is below a predetermined pressure.

The predetermined pressure is a pressure that is required to obtain a good fan-like spray. It may be 100 mbar or more above the ambient pressure and, preferably, below 3 or 4 bar above ambient.

Preferably, the distal end of the elastomeric tube is closed.

By providing a closed end to the tube, all the fluid has to exit through the slit.

In an alternative embodiment, the distal end of the tube is preferably open for entering the fluid into the elastomeric tube from both the proximal end and the distal end.

According to another aspect of the invention, there is provided a garment steamer comprising a steam generator including a chamber and a water supply hose extending into said chamber for supplying water from a reservoir into said chamber for conversion of water into steam and, a spray nozzle according to the invention attached to an end of said water supply hose within the chamber.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which:

FIG. 4A is a plan view of the spray nozzle shown in FIGS. 1 to 3;

FIG. 4B illustrates a typical fan-like spray pattern achieved using the spray nozzle of FIG. 4A;

FIG. 5A is a plan view of the spray nozzle shown in FIGS. 1 to 3 with a differently shaped slit;

FIG. 5B illustrated a typical fan-like spray pattern achieved using the spray nozzle of FIG. 5A;

DETAILED DESCRIPTION OF THE EMBODIMENTS

A spray nozzle 1 is shown in FIGS. 1 to 7. The spray nozzle 1 is primarily for use in a steam generator 2 of a garment steamer 3 (see FIG. 9) for spraying water onto a heated surface 4 for conversion into steam. The spray nozzle 1 ensures that the water ejected by the nozzle 1 is spread uniformly across the heated surface 4 without becoming blocked with scale or other contaminants.

Figure 1:
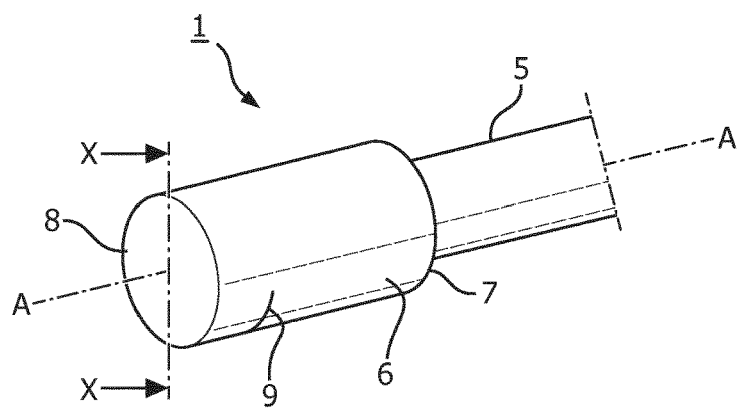
FIG. 1 is a perspective view of a spray nozzle according to an embodiment of the invention.
Figure 2:
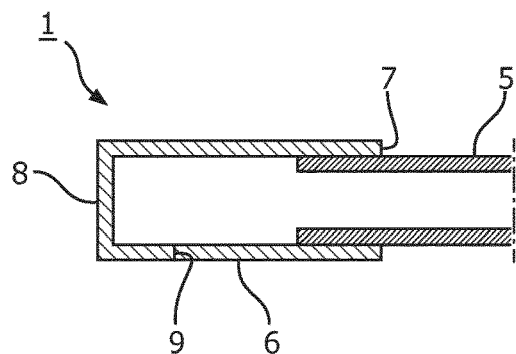
FIG. 2 is a cross-sectional side elevation of the spray nozzle of FIG. 1 without any liquid flowing therethrough.
Figure 3:
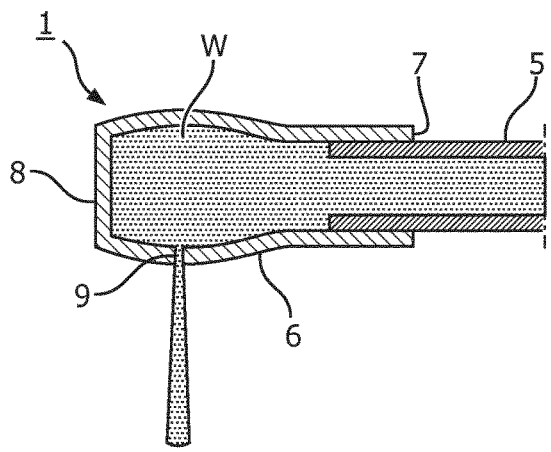
FIG. 3 is the same view as FIG. 2, but with liquid flowing through the spray nozzle.

FIG. 1 is a perspective view of the spray nozzle or elastomeric tube 1 shown attached to or extending from the end of a water supply hose 5. The spray nozzle 1 is preferably a sleeve formed by a wall 6 and has a longitudinal axis A-A. The spray nozzle 1 is preferably made from a fluid impermeable, resilient, material which is open at its proximal end 7, i.e. the end which is attached to the water supply hose 5, and closed at its distal end 8, i.e. its opposite end remote from the water supply hose 5. The proximal end 7 preferably has a smaller diameter than the diameter of the end of the water supply hose 5 to which it is attached, so that the proximal end 7 may be elastically deformed and forced over the end of the water supply hose 5 thereby mounting the spray nozzle 1 to the end of the water supply hose 5. The spray nozzle 1 is then held in place on the end of the water supply hose 5 by friction which will always exceed the maximum water pressure to prevent the water from pushing the spray nozzle 1 off the end of the water supply hose 5. Alternatively, a hose connector or clamp (not shown) may be used to retain the nozzle 1 on the water supply hose 5.

The opposite, distal end 8, of the wall 6 remote from the proximal end 7 is preferably closed or blocked, so the only passage for the flow of water out of the spray nozzle 1 is via a slit 9 formed in the wall 6. The wall 6 is preferably cylindrical. It will be appreciated that the wall 6 can take other forms and can have other shapes. For example, it can be made up of both straight and curved sections.

As shown in the Figures, the slit 9 is formed in the cylindrical wall 6 and is spaced from both the proximal and distal ends 7,8 of the spray nozzle 1. The slit 9 preferably extends in a circumferential direction about the axis A-A of the cylindrical wall 6. In the absence of water flow through the spray nozzle 1, the slit 9 preferably remains closed, i.e. the opposing edges of the slit 9 lie in abutting relation to each other. However, when water 'W' flows into the spray nozzle 1 and the pressure in the spray nozzle 1 exceeds a predetermined pressure, the material in the locality of the slit 9 preferably deforms so that the opposing edges of the slit 9 separate, thereby allowing water to spray out, as shown in FIG. 4. The length of the slit 9 determines the width of the spread pattern of the water jet from the slit 9. Preferably, the length of the slit 9 is equal to or less than half the circumference of the spray nozzle 1.

The predetermined pressure is a pressure that is required to obtain a good fan-like spray which depends upon the sealing force of the opposing edges of the slit 9, the material properties of the spray nozzle 1 such as its elasticity and tensile strength, the pump pressure-flow characteristics. A very large pressure may tear the nozzle 1, so it is preferable to restrict the pressure to below 3 or 4 bar above ambient. The pump 18 may have a pressure rating of, for instance, between 0.5 bar to 11 bar.

FIG. 4B shows a general indication of the type of spray pattern 'S' available when the spray nozzle 1 has a slit 9 as described above, with reference to FIGS. 1 to 3 and 4A. As the slit 9 extends circumferentially about the axis A-A of the cylindrical wall 6, without deviating axially, the resulting spray pattern is substantially linear.

FIG. 5B shows a plan view of a spray nozzle 1 which is similar to the spray nozzle 1 of FIGS. 1 to 4A, except that the slit 9' is curved in a direction towards the distal end 8. FIG. 5B shows a general indication of the type of spray pattern 'S' available when the spray nozzle 1 has a slit 9' as shown in FIG. 5A. As the slit 9' is curved, the resulting spray pattern also has a correspondingly arcuate shape.

It will be appreciated that the slit 9 can take other forms and can have other shapes. For example, it can be made up of both straight and curved sections or it may have a wave-like profile. There may also be more than one slit 9,9' in the cylindrical wall 6. Each slit 9 may be spaced from its adjacent slit 9 in an axial direction or, in a circumferential direction.

Figure 6:
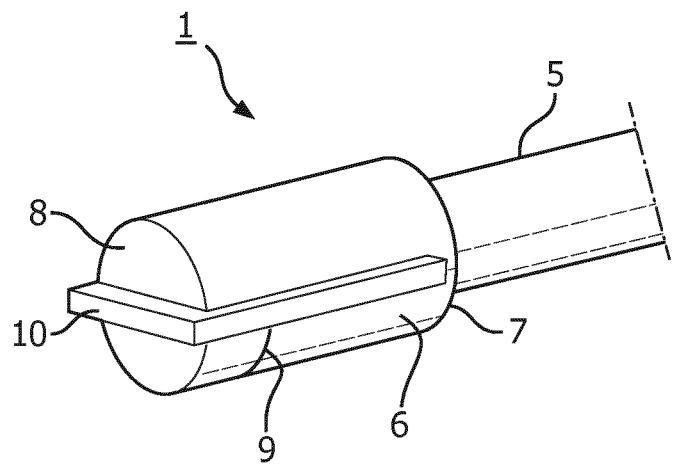
FIG. 6 is a perspective view of the spray nozzle shown in FIGS. 1 to 5B, which includes an integral reinforcing element.
Figure 7:
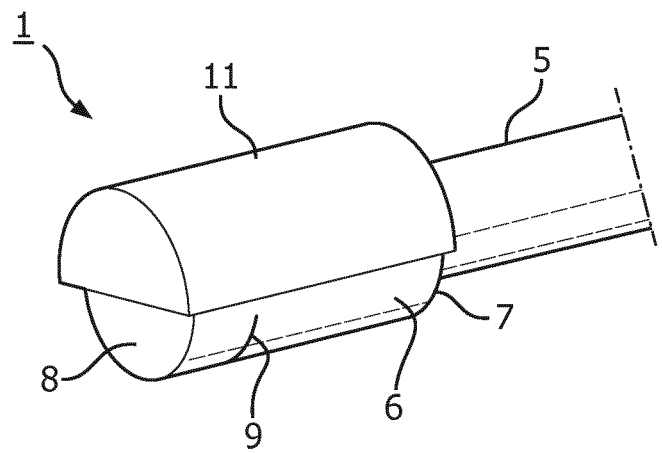
FIG. 7 is a perspective view of the spray nozzle shown in FIGS. 1 to 5B, which includes a reinforcing element as a separate component.

With reference to FIGS. 6 and 7, a reinforcing element 10,11 preferably partially surrounds the elastomeric spray nozzle 1. The reinforcing element 10,11 is preferably formed from a stiffer or more resilient material that the material from which the spray nozzle 1 is formed and prevents excessive deformation of the spray nozzle 1. The reinforcing element 10 may be integrally formed with the spray nozzle 1 or it can be a separate component or housing 11 that attaches to or closely surrounds the spray nozzle 1. In the embodiment of FIG. 6, the reinforcing element 10 preferably comprises a region or waist of increased thickness that extends along the curved surface 6 and across the distal end 8. In the embodiment of FIG. 7, the reinforcing element 11 preferably comprises a separate cap or housing that surrounds an upper part of the spray nozzle 1.

Figure 8A:
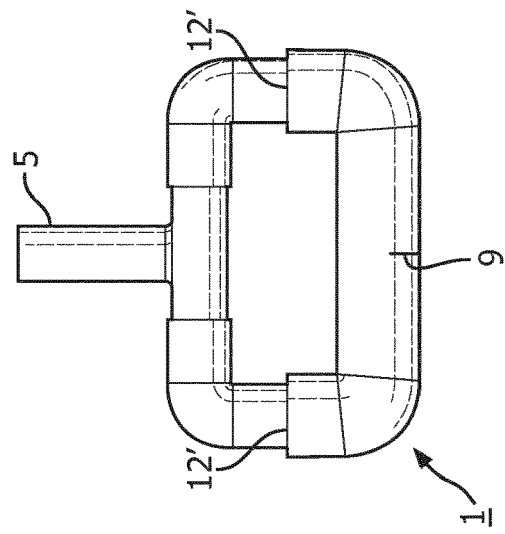
FIGS. 8A to 8C illustrate three alternative embodiments according to the invention in which the spray nozzle forms part of a looped circuit of a pipe conduit in each case.
Figure 8B:
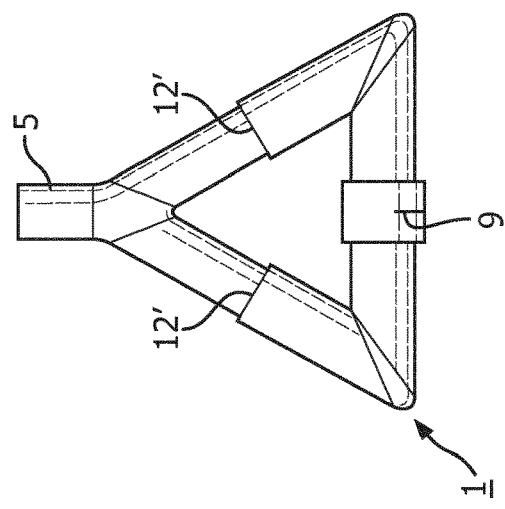
Figure 8C:
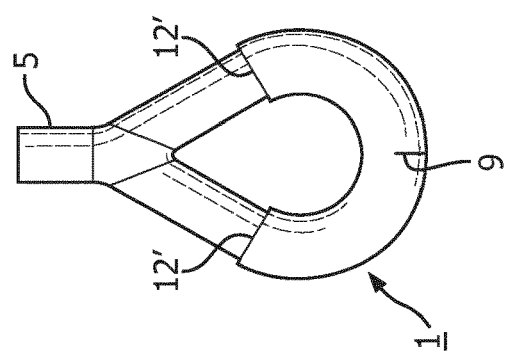

In each of the embodiments described above, the distal end of the elastomeric tube 1 is closed. However, FIGS. 8A, 8B and 8C each show possible alternative embodiments in which the spray nozzle 1 is open at both ends but the water supply hose 5 is preferably forked and couples to both ends 12' of the spray nozzle 1 so as to supply water into the spray nozzle 1 through both ends 12'. The water supply hose 5 forms a looped circuit together with the spray nozzle 1. With particular reference to FIG. 8A, the spray nozzle 1 may assume a curved shape when both ends 12,12' are attached to the water supply hose 5. The pressurization and spray effect are similar to previous embodiments.

Figure 9:
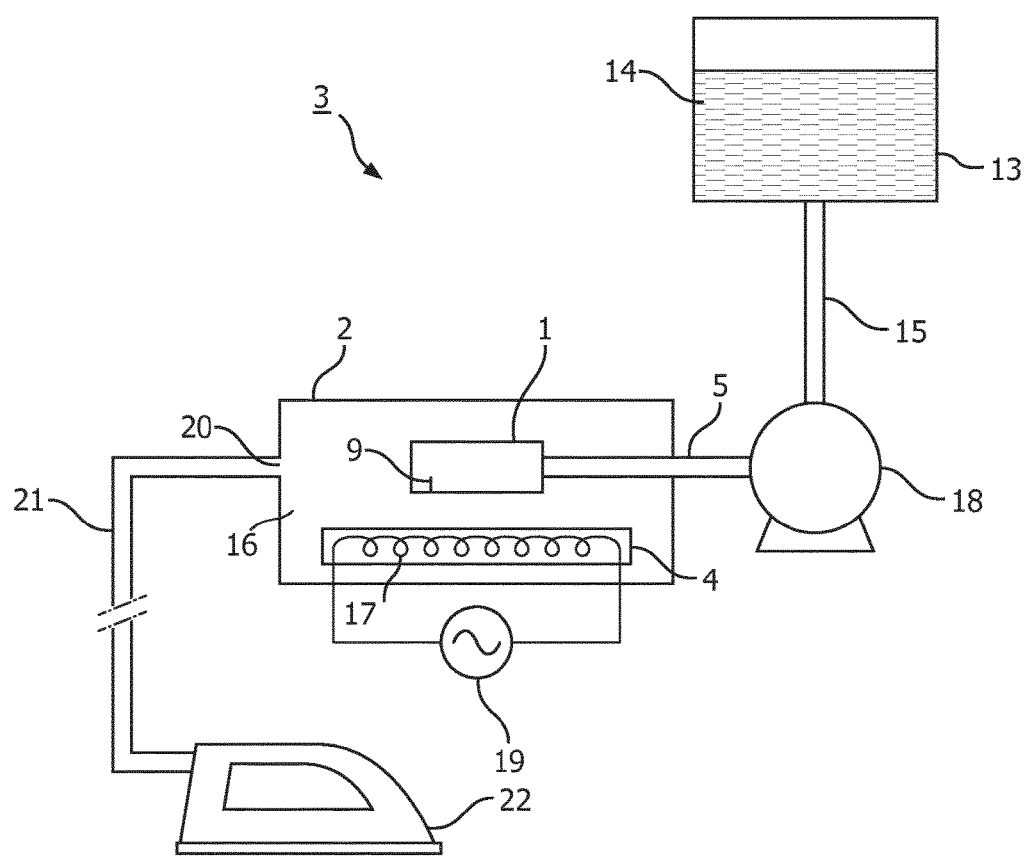
FIG. 9 is a schematic illustration of a garment steamer that incorporates the spray nozzle according to embodiments of the present invention.

With reference to FIG. 9, there is shown a schematic illustration of a garment steamer 3 that incorporates the spray nozzle 1 according to an embodiment of the invention. The garment steamer 3 preferably comprises a chamber or reservoir 13 to contain a supply of liquid such as water 14. A pipe 15 may fluidly communicate the reservoir 13 with an electrically powered pump 18 which draws water from the reservoir 13 and supplies it via the water supply hose 5 to the spray nozzle 1 located in the chamber 16 of a steam generator 2. A water treatment means (not shown) may optionally be provided in the water path. A heating element 17 is preferably located in the steam chamber 16 which heats a surface 4 so that water sprayed through the slit 9 from the nozzle 1 contacts the surface 4 and is turned into steam. Alternatively, surface 4 may be formed from the walls of the steam chamber 16, and so the heating element 17 may be in thermal connection with the steam chamber 16. Heating element 17 is preferably controlled by a temperature control means, for instance, a thermostat 19.

The nozzle 1 directs a fan-shaped jet of water as a single stream onto the heated surface 4. The slit 9 is preferably shaped and/or sized to control the spread of the jet and ensure that the heated surface 4 is uniformly sprayed with water across it, thereby providing maximum steam generating efficiency.

The steam generated in the steam chamber 16 preferably passes through an outlet 20 from the chamber 16 and along a flexible steam supply conduit such as a hose 21 and into a hand-held steamer 22, which may, for example, be an ironing appliance for ironing garments. Alternatively (not shown), the steam generator may be located in the hand-held steamer, while the water is supplied from a reservoir located in the hand-held steamer or in a separate base. The electrical pump may be operated in a pulsed manner to achieve the designed flow rate (averaged over time).

The elastomeric material may be chosen from a range of resilient materials depending on the operating temperatures, in particular on the operating temperatures in a garment steamer steam generator, such as, for instance, EPDM (ethylene propylene diene monomer), Silicone rubber, Fluorocarbon elastomers, or other temperature and steam resistant elastomers or elastomer-polymer blends. The wall thickness of the elastomeric tube 1 can be between 0.5 mm and 5 mm, and the internal dimension across the wall, i.e. its diameter in the case of a cylindrical tube, can be from 2 mm to 20 mm or, most preferably, between 2 mm and 15 mm. The elastomer hardness can be between 30 and 90 Shore A.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the spirit and scope of the technique approaches of the present invention, which will also fall into the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. A spray nozzle comprising:
   an elastomeric tube comprising a proximal end through which a fluid is intended to enter the tube, and a distal end, the elastomer tube having a longitudinal axis;
   a slit formed in the elastomeric tube between the proximal end and the distal end, for spraying the fluid out from the elastomeric tube, the slit opening in response to pressure from the fluid within the elastomeric tube, wherein the slit extends through the elastomeric tube in a non-parallel direction to the longitudinal axis; and
   a reinforcing element for limiting deformation of the elastomeric tube caused by the fluid pressure within the elastomeric tube.

2. The spray nozzle according to claim 1, wherein the elastomeric tube comprises a cylindrical wall, the slit being formed in the cylindrical wall.

3. The spray nozzle according to claim 2, wherein the slit is arcuate in a non-circumferential direction about the longitudinal axis of the elastomeric tube.

4. The spray nozzle according to claim 2, wherein the slit extends in a circumferential direction about the longitudinal axis of the elastomer tube.

5. The spray nozzle according to claim 2, wherein the reinforcing element surrounds side portions of the cylindrical wall, leaving the slit exposed.

6. The spray nozzle according to claim 5, wherein the reinforcing element extends across the distal end of the elastomeric tube, the distal end of the elastomeric tube being closed.

7. The spray nozzle according to claim 5, wherein the reinforcing element is formed integrally with the elastomeric tube.

8. The spray nozzle according to claim 7, wherein the reinforcing element comprises a region of increased thickness of the material forming the elastomeric tube.

9. The spray nozzle according to claim 1, wherein the reinforcing element is a separate component, secured to the elastomeric tube in a fixed position, that surrounds only an upper part of the elastomeric tube opposite the slit formed in the elastomeric tube.

10. The spray nozzle according to claim 9, wherein the separate component comprises a housing secured to the elastomeric tube in the fixed position.

11. The spray nozzle according to claim 1, wherein the slit has opposing edges, the edges being in contact with each other in a closed position when the fluid pressure within the elastomeric tube is below a predetermined pressure.

12. The spray nozzle according to claim 1, wherein the distal end of the elastomeric tube is open for entering the fluid into the elastomeric tube from both the proximal end and the distal end.

13. A garment steamer comprising:
  a steam generator including a chamber and a water supply hose extending into the chamber for supplying water from a reservoir into the chamber for conversion of water into steam;
  a heating element for heating a surface within the chamber; and
  a spray nozzle within the chamber attached to an end of the water supply hose, the spray nozzle comprising:
    an elastomeric tube comprising a proximal end attached to the water supply hose and a closed distal end, the elastomer tube having a longitudinal axis;
    a slit formed in the elastomeric tube between the proximal end and the distal end, for spraying the water out from the elastomeric tube onto the heated surface to create steam, the slit opening in response to pressure from the water within the elastomeric tube, wherein the slit extends through the elastomeric tube in a non-parallel direction to the longitudinal axis; and
    a reinforcing element for limiting deformation of the elastomeric tube caused by the fluid pressure within the elastomeric tube.

14. The garment steamer according to claim 13, wherein the distal end of the elastomeric tube is closed.

15. The garment steamer according to claim 13, wherein the reinforcing element surrounds side portions of the elastomeric tube, leaving the slit exposed, and extends across the distal end of the elastomeric tube, wherein the distal end of the elastomeric tube is closed.

16. The garment steamer according to claim 15, wherein the reinforcing element is formed integrally with the elastomeric tube.

17. The garment steamer according to claim 16, wherein the reinforcing element comprises a region of increased thickness of material forming the elastomeric tube.

18. The garment steamer according to claim 13, wherein the reinforcing element is a separate component, secured to the elastomeric tube in a fixed position, that surrounds only an upper part of the elastomeric tube opposite the slit formed in the elastomeric tube.

19. The garment steamer according to claim 18, wherein the separate component comprises a housing secured to the elastomeric tube in the fixed position.

* * * * *